United States Patent

Thomas et al.

[11] Patent Number: 5,537,090
[45] Date of Patent: Jul. 16, 1996

[54] TRUCK TIRE UNDERINFLATION DETECTION AND CONTROL SYSTEM

[76] Inventors: Stephen E. Thomas, 38840 Godrey Pl., Fremont, Calif. 94536; Mark S. Thomas, 5058 Dunsmuir Common, Fremont, Calif. 94555

[21] Appl. No.: 520,749

[22] Filed: Aug. 29, 1995

Related U.S. Application Data

[63] Continuation of Ser. No. 375,656, Jan. 20, 1995, abandoned.

[51] Int. Cl.$^6$ .................................................... B60C 23/00
[52] U.S. Cl. ........................ 340/443; 340/447; 340/449; 340/445; 200/61.22; 116/34 R; 73/146.5
[58] Field of Search .................................. 340/442, 443, 340/448, 449, 445; 200/61.22; 116/34 R; 73/146.5, 146.8; 374/122, 131

[56] References Cited

U.S. PATENT DOCUMENTS

| | | | |
|---|---|---|---|
| 4,570,152 | 2/1986 | Melton et al. | 340/449 |
| 4,712,635 | 12/1987 | Sumiya et al. | 180/197 |
| 4,875,176 | 10/1989 | Harsch et al. | 364/557 |
| 4,878,761 | 11/1989 | Diihrkoop | 340/449 |
| 4,918,423 | 4/1990 | Fukayama et al. | 340/448 |
| 4,998,092 | 3/1991 | Ohno et al. | 340/448 |
| 5,131,758 | 7/1992 | Heyman et al. | 374/57 |
| 5,274,355 | 12/1993 | Galan | 340/442 |
| 5,353,020 | 10/1994 | Schurmann | 340/448 |

*Primary Examiner*—Brent A. Swarthout
*Assistant Examiner*—Nina Tong
*Attorney, Agent, or Firm*—Linval B. Castle

[57] ABSTRACT

A truck tire/wheel assembly detection system in which the moving thermal dynamics of a truck are measured before cooling off, by passing over and around contact or non-contact thermometers directed toward the tire/wheel assembly and transmits the approximate temperature of each tire/wheel assembly to a computer which will compares the output data and identifies each abnormally overheated tire/wheel assembly and print out location on rig and other information that may be required. A modem controlled by the computer is used to advise other interested parties of rig condition at this check out point.

7 Claims, 1 Drawing Sheet

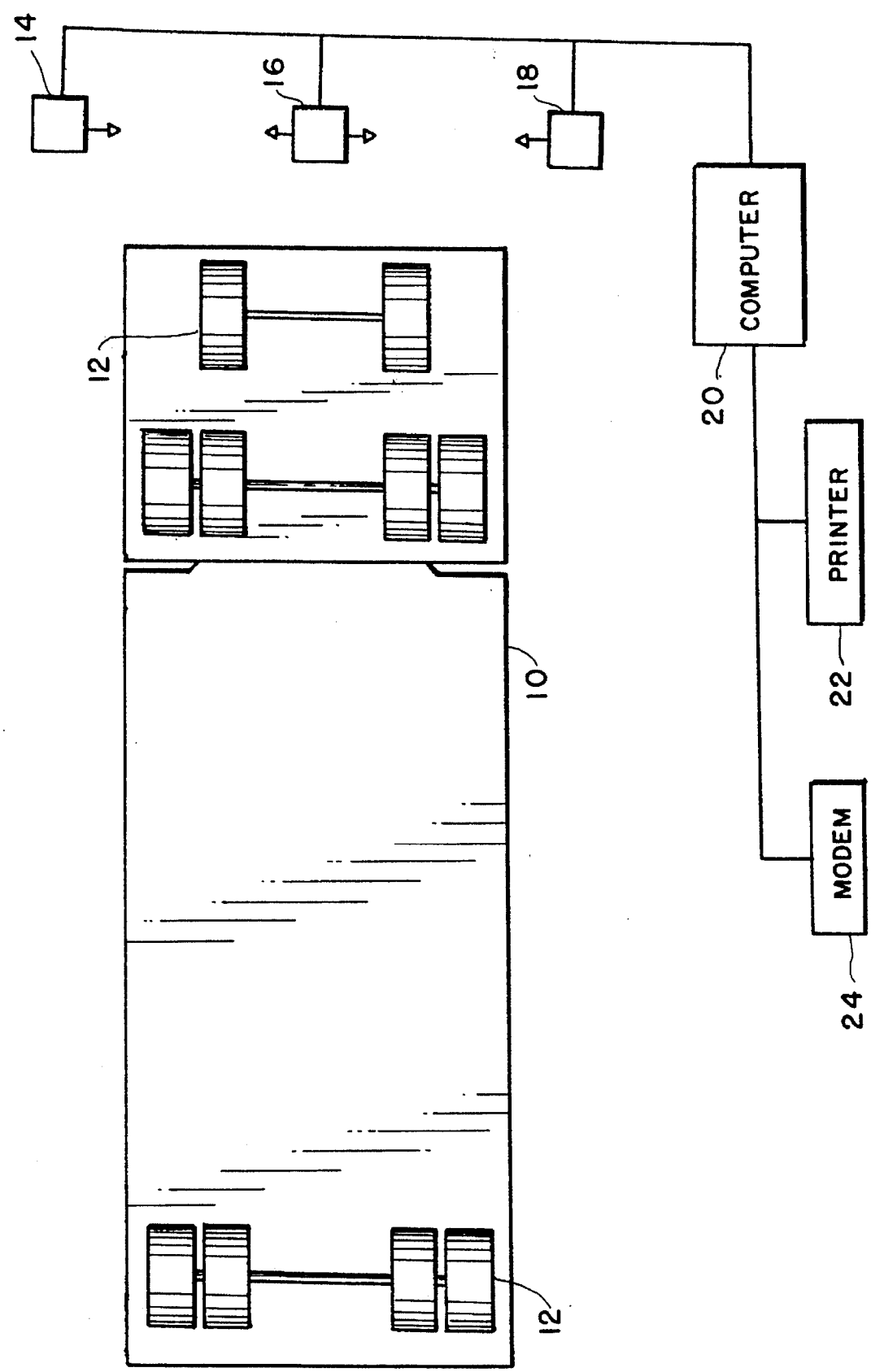

TRUCK TIRE UNDERINFLATION DETECTION AND CONTROL SYSTEM

This application is a continuation, of application Ser. No. 08/375,656, filed Jan. 20,1995, now abandoned This invention relates generally to a method of detecting underinflated tires as well as brake drag and axle bearing failure on over road vehicles, but particularly to a novel system for very rapidly detecting which tire on a multi-axled trucking rig has lost pressure.

BACKGROUND OF THE INVENTION

Tire underinflation has always been a serious concern to the trucking people as well as the Federal and State Highway people. An underinflated tire, usually caused by a slow leak resulting from a malfunctioning air valve, causes shorter tire life, more fuel expenditure and increased wear on the highway surface. All parties involved in use and care of the highway system would benefit from a practical solution that yields a timely warning of underinflated tires for the following reasons:

A. Truck fleets would save on fuel, tires, labor and road "downtime".

B. Federal and State highway authorities agree that proper and practical tire pressure control would assist in the maintenance of road surface condition, extend the life of the road systems and decrease road repair expenses. The reason is that a slow leak in one tire of a dual tire arrangement increases the dynamic impact characteristics on the road. The greater the transfer of load from "leaker" to the good tire the greater the potential damage to good tire and road surface. The current weigh stations enforce the law with respect to axle loading and rating of tires for specific axle loading; however, there is no provision for checking the working tires as a support system with respect to said axle loading. Information with respect to the effective tire foot print area supporting a given load is most important, since it defines unit pressure exerted on the road service by the support members. It is our belief that this passive system will complement the present weigh station system. The need has existed for years for a passive system which would INDICATE underinflated tires on a moving rig without any DIRECT human contact with the vehicle. This passive system alerts the driver of a pending or existing underinflation problem. The setting of alarm levels of pressure loss should be decided between highway management and trucking management since these parameters must reflect the necessary trade-offs of the actual practical field operation.

C. The public would appreciate the higher quality of road surface and the cost savings on road construction and repair.

There have been a number of designs to detect the underinflation tire problems in heavy "over the road" vehicles. To this point none have sold successfully because of a combination of high initial cost, increased operational and maintenance costs and unsatisfactory field experiences. The reason for the high costs is that all prior systems have directed their attention to mounting the sensor devices on each individual tire of the vehicle. It is time to revisit the low pressure tire problem with a new evaluation of how to solve the problem. It is necessary to accept certain basic facts as follows:

1. It must be recognized that successful commercial fleets are well maintained and that few trucks leave the company garage area with low tires, brake drag or bad bearings.

2. It must be recognized that modern drivers are better trained and are working with much better equipment than in the past. Todays drivers are equivalent to mid-level managers in a manufacturing corporation and handle their work with a great degree of competence.

3. It must be recognized that the manufacturers have made great strides in the design of modern tires, brakes and axle bearings. The incidence of catastrophic tire/wheel failures are quite rare.

4. It must be recognized that over ninety five per cent of the problems of a tire/wheel assembly result from the slow tire leaks usually caused by unseating and damage to the tire valve. Unfortunately, the best maintenance department cannot protect the rig from the results of such slow tire leaks while long haul vehicles are miles away from the maintenance base for prolonged periods of time. In a profitable trucking operation, the time a big rig is away from home maintenance center is at least 85% to 90% of rig life. It is during this dynamic road time that symptoms of a tire pressure problem are the most apparent and can be corrected before additional vehicle operational costs and damage to road surface are incurred. This system will also reduce needless tire pressure checking with the air pressure gauge which is very often the cause of the slow leaking tire/wheel assembly.

OBJECT OF INVENTION

The object of this invention is to provide a system which can detect an underinflated tire/wheel assembly on a stationary vehicle or a moving vehicle passing through a check lane. Another object of this invention is to provide a system which will increase profits to trucking interests as well as to increase highway surface life. It is a win win situation for all parties concerned with the use, management and condition of the nation's highway system e.g. the trucking business, the Federal & State Highway Departments and the public.

The proposed system is a noninvasive practical passive system which will operate on the basis that the low tire is an exception rather than the rule, but also that the low tire condition accounts for over 95% of tire/wheel problems. Therefore, the design goal is to locate a specific DYNAMIC anomaly in tire mount area which correlates with possible tire/wheel assembly failure modes. This invention employs a passive system which observes the anomaly of temperature variations in the tire/wheel assembly derived from the energy dynamics of an "over the road" rig generating the temperature rise alert of a slow leak tire condition; or an overheated wheel caused by unusual mechanical friction. This preventative step will allow time to correct a faulty condition so that the vehicle proceeds without loss of a tire or "road downtime" costs and possibly inflict damage to road surface. It should be stressed that this system is workable only because modern equipment and maintenance allow a standard to be set because of the normal operation of a large percentage of tires on any given rig. This standard allows meaningful analysis of the temperature variation relative to excess heat development in underinflated tire/wheel assembly as compared to the normal operating tire/wheel assemblies. It should also be stressed that the system defined herein is obviously only one of many possible system configurations.

BRIEF DESCRIPTION FOR THE DRAWINGS

The drawing illustrates the preferred embodiment of the invention and show the initial layout plan of a large truck with tire/wheel thermometers and associated equipment in block form.

DETAILED DESCRIPTION OF THE PREFERRED EMBODIMENT

As shown in the drawing, a tractor-trailer rig 10 has entered a check point and will immediately (BEFORE COOL Off) proceed to pass over and around non-contact thermometers 14, 16 and 18 which are aimed toward the hub and sidewall of the tire of each tire/wheel assembly 12 and positioned to measure the temperature of each tire and/or wheel as it passes. A standard non-contact thermometer, such as Raynger PM manufactured by Raytek Inc., is used and requires approximately one second to read the temperature of all wheels per axle from a wide range of distances. In the system disclosed herein, it is the initial plan to use a range of 3 to 15 feet for a total read out time for a 10 wheel vehicle (moving at 2–3 MPH) of approximately 20 seconds. This time may be decreased by having the thermometers 14–18 track the tire/wheel targets when the rolling tire activates a switch signal on a given axle as the vehicle moves forward and/or increase sensor pattern readout points. There are applications in which user could elect to utilize a hand held contact type thermometer read out; e.g. individual fleets checking incoming equipment immediately on arrival at home maintenance center. This action would save a fleet considerable money currently being spent on manual air gauge tire pressure checking labor costs, and decrease the many slow leaks introduced by the very use of the air gauge. The less a properly seated air valve seal is disturbed the better.

The temperature output from each thermometer 14–18 is fed into a computer 20 for processing into a format which would name specifically the axle number, the side of the rig, and which tire/wheel assembly has an abnormally high temperature. It will also be able to show average tire/wheel temperature as well as peak temperature plus any other information desired by highway management people as well as the individual fleet managers. Should field track tests show that after a certain number of miles the wheel metal hub thermal conductivity results in the duals reaching temperature equilibrium then the thermometer arrangement would change to use either a combination of 14 & 18 or the center bi-directional mount 16. In either case, the specific axle and specific side would be indicated and the driver would use an air gauge to find the specific underinflated tire on the dual wheel which he would do in any case to verify that low tire pressure is actually the cause and not other mechanical drag problems e.g. bearing or brake drag.

It should be noted that all tire/wheel units 12 on the same rig have undergone the same ambient temperature, same elevation, same speed and road conditions. Therefore a significant difference or differences of temperature on a tire/wheel unit 12 on the same rig from norm would point to a problem. The computer 20 is coupled to a printer 22 which prints out specific tire/wheel assembly and a caution to instruct driver to air the tire before proceeding. (An airing facility should be set up for this purpose) If the tire is moderately hot and should be watched a caution print out is prepared for driver. The temperature levels of alarm and necessary actions should be set up by management personnel utilizing fleet and tire manufacturers inputs. The computer 20 is therefore provided with a modem for notifying subsequent check point of the truck identification and the particular tire/wheel that was given a caution printout. The system is symbiotic to all parties concerned and there is a real incentive for driver to heed the caution tag. Consideration should be given to sending copy of all caution or "stop and air" instructions to the management of the involved rig. This action is not "big brother" syndrome; since it could also furnish fleet management valuable information for their analysis that the driver print out would not need to contain.

We claim:

1. A system for discovering and identifying from a plurality of tire/wheel assemblies on a truck slowly moving past stationary, non-contact temperature sensors and prior to cooling off, specific tire/wheel assemblies having an abnormal temperature, said system comprising:

at least one stationary, non-contact temperature sensor positioned adjacent and spaced from a side of the truck tire/wheel assembly and directed toward a sidewall of said assembly for measuring the approximate temperature of each tire/wheel assembly passing said sensor;

computer means coupled to the output of said temperature sensor for comparing the data sampled from each tire/wheel assembly, for computing the norm for said tire/wheel assemblies and for identifying an abnormally overheated tire/wheel assembly on said truck; and communication means coupled to said computer means for advising truck personnel of the identity of an abnormally overheated tire/wheel assembly.

2. The system claimed in claim 1 wherein said computer means identifies an axle and an abnormally overheated tire/wheel assembly.

3. The system claimed in claim 1 wherein said communication means includes printout means.

4. The system claimed in claim 3 wherein said printout means prints out the specific location on the vehicle of the abnormally overheated tire/wheel assembly on the vehicle.

5. The system claimed in claim 1 wherein said printout means also prints a precautionary printout advising of a tire/wheel assembly overheated above a predetermined safe level.

6. The system claimed in claim 1 further including a modem controlled by said computer means for transmitting information of a tire/wheel assembly having an abnormal temperature.

7. A method for detecting and identifying an abnormally overheated tire/wheel assembly in a plurality of tire/wheel assemblies on a truck slowly passing stationary, non-contact temperature sensors and prior to said assemblies cooling after said truck has been traveling, said method comprising the steps of:

positioning at least one stationary, non-contact temperature sensor adjacent and spaced from a side of the truck tire/wheel assembly, said sensor directed toward a sidewall of said assembly for producing an output indicative of the approximate temperature of each of said tire/wheel assemblies passing said sensor;

coupling the output of said sensor to a computer for computing an approximate temperature norm for the plurality of tire/wheel assemblies on said truck; and providing a written readout from said computer, said readout indicating specific tire/wheel assemblies which have a approximate temperature higher than said norm.

\* \* \* \* \*